R. M. P. THORP.
TIRE.
APPLICATION FILED DEC. 23, 1912.

1,068,025.  Patented July 22, 1913.

Witnesses:
Leonard A. Powell.
Sydney E. Taft.

Inventor
Roy M. P. Thorp,
by his attorney,
Charles S. Gooding.

UNITED STATES PATENT OFFICE.

ROY M. P. THORP, OF CAMBRIDGE, MASSACHUSETTS, ASSIGNOR OF ONE-THIRD TO CLAUDE E. DAVIS, OF CAMBRIDGE, MASSACHUSETTS.

TIRE.

1,068,025.

Specification of Letters Patent.   Patented July 22, 1913.

Application filed December 23, 1912. Serial No. 738,114.

*To all whom it may concern:*

Be it known that I, ROY M. P. THORP, a subject of King George V, residing at Cambridge, in the county of Middlesex and State of Massachusetts, have invented new and useful Improvements in Tires, of which the following is a specification.

This invention relates to improvements in tires for motor vehicles and particularly to the non-skidding type of tire of the cut-in variety, that is to say, those having depressions formed in the treads thereof instead of projections. In this type of tire, which includes a great variety of designs, the depressions or grooves formed in the peripheries thereof are calculated to retain a grip upon the asphalt, and greasy pavements or any other hard surfaces forming as it were a suction which prevents the driving wheels of the motor vehicle slipping thereby saving power and increasing the speed of the vehicle. Furthermore said suction prevents the car from skidding when making a turn.

The object of the invention is to provide a tire of the aforesaid type having depressions or grooves arranged circumferentially along the tread thereof and so positioned with relation to said tread that two or more of said depressions will always be in contact with and completely closed by the surface of the road with which said tire is in contact, said depressions being disposed laterally of said tread.

The invention consists in the combination and arrangement of parts set forth in the following specification and particularly pointed out in the claims.

Figure 1:
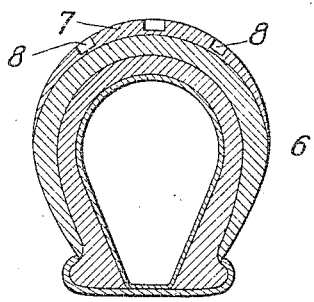
Figure 2:
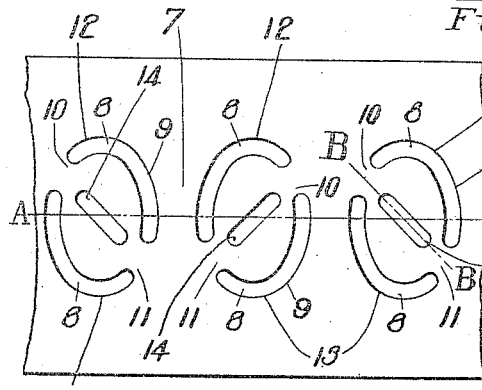
Figure 3:
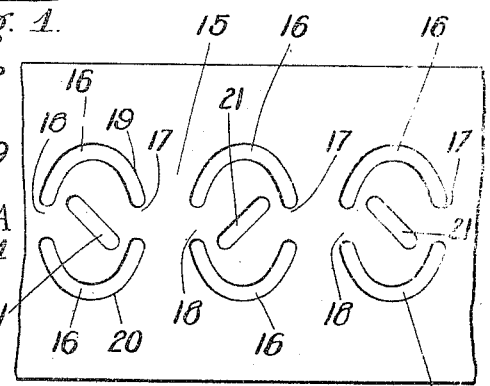
Figure 4:
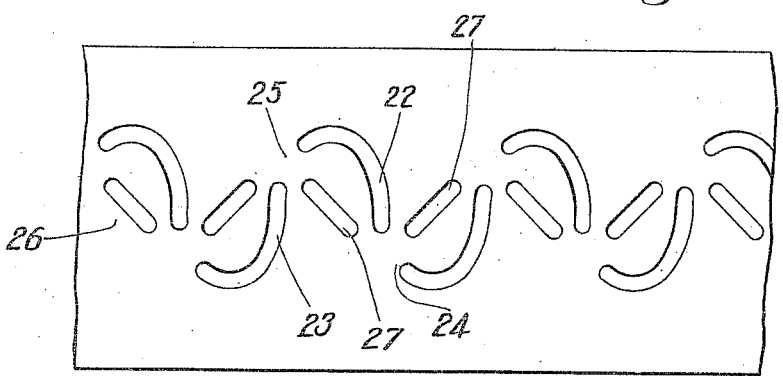
Figure 5:
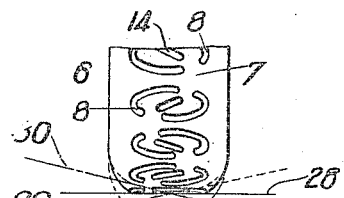

Referring to the drawings: Figure 1 is a section through the rim of an automobile tire embodying my invention. Fig. 2 is a development of a portion of the tread of the tire illustrated in Fig. 1 showing the preferred arrangement of the depressions or grooves therein. Figs. 3 and 4 are views similar to Fig. 2 illustrating still other arrangements of the grooves or depressions in the tread of a tire. Fig. 5 is a diagrammatic view illustrating a tire embodying my invention in connection with road surfaces of various inclinations.

Like numerals refer to like parts throughout the several views of the drawings.

In the drawings, 6 is a tire, which may be either an inner tube or pneumatic tire, or a solid tire as desired, and 7 is a tread which is provided with a series of depressions or grooves 8 preferably disposed along said tread so as to bring the greater portion of their lengths at one side of the central plane of rotation of said tread, as indicated by the line A, A in Fig. 2. This may be accomplished in many ways, but preferably the grooves 8 are circularly disposed, or better still, form ellipses 9 whose longer diameters extend laterally relatively to said plane of rotation, said grooves being interrupted by partitions 10 and 11 upon opposite sides of the center of said ellipses and upon opposite sides of said plane of rotation, thus forming two substantially semicircular grooves 12 and 13. A greater portion of the groove 12 is located on one side of said plane, while the greater portion of the groove 13 is located on the opposite side of said plane. The elliptically disposed grooves 9 are arranged circumferentially about the periphery of the tread 7 and are preferably uniformly spaced thereabout. Another series of grooves 14 are also arranged circumferentially about the periphery of the tread 7 and these grooves are perfectly straight and symmetrically placed laterally of said plane of rotation, the longitudinal center lines of said grooves being oblique to said plane. Furthermore said grooves 14 are located within the elliptically disposed depressions 9 and are positioned within said elliptically disposed depressions with their longitudinal center lines B, B passing through the partitions 10 and 11 substantially midway thereof. Said depressions 14 terminate at distances inside of said partitions thus providing a substantial amount of material between the opposite ends of said depressions 14 and the ends of the depressions 12 and 13.

In order that the pressure on the tire 6 laterally relatively to the central plane of rotation thereof may be evenly balanced in opposite directions, the angle of the longitudinal center lines of the depressions 14 alternate first toward one side and then toward the other side of said plane of rotation and the partitions 10 and 11 of their respective elliptically disposed grooves arranged accordingly.

Referring now to Fig. 3, I have shown another arrangement of the partitions. In this form the tread 15 is provided with grooves or depressions 16 which are preferably elliptically disposed as in Fig. 2. In this case however said depressions are interrupted by partitions 17 and 18 arranged symmetrically relatively to the central plane of rotation of said tire, thus placing the parts 19 and 20 entirely upon the opposite sides of said central plane of rotation, while another series of inclined grooves 21 are arranged within said elliptically disposed grooves 16 and successively incline in opposite directions relatively to said plane of rotation as for the purpose hereinbefore described relatively to the groove 14.

In Fig. 4 I have illustrated still another arrangement of the depressions circumferentially of the tire tread 7. In this case a zigzag groove is formed progressing laterally from side to side of said tread circumferentially thereof and forming reverse curves 22 and 23, these curves being interrupted by partitions 24 and 25 upon opposite sides of the central plane of rotation of the tread 26. Intermediate the several sections of said zigzag groove are provided grooves 27 similar to the grooves 14 and 21 of Figs. 2 and 3 respectively. These grooves are also oblique to the central plane of rotation of the tire, successive grooves being inclined in opposite directions relatively thereto and with their longitudinal center lines bisecting the partitions 24 and 25, respectively.

In Fig. 5 I have illustrated the tire 6 in contact with surfaces inclining at various angles relatively to the central plane of rotation of said tire to more clearly illustrate the functions of the depressions hereinbefore shown and described.

The general operation of the device hereinbefore specifically described is as follows: Assuming the surface of the road which is being traversed to be level or at right angles to the central plane of rotation of the tire 6, as indicated by the line 28, Fig. 5, the tire 6 will contact therewith substantially along the perimeter of the central plane of rotation, as indicated by the line A, A of Fig. 2, the tire 6 will be flattened slightly by the weight of the vehicle for a distance slightly less than the length of the long diameters of the elliptically disposed grooves 9 and 16. Consequently the depressions 12 and 13 will be in contact with the surface 28 for only a portion of their lengths, while the depression 14 will be entirely covered and as the tire rolls along over the surface 28 with the successive depressions 14 coming in contact therewith, the air will be forced from said depressions and consequently form a suction which causes said tire to firmly grip the surface of the road thereby preventing slipping or skidding. By arranging said depressions 14 oblique to the central plane of rotation, as hereinbefore stated, the flattening effect of the tire tread in either the lateral or circumferential direction will not cause the opposite sides thereof to draw together to any appreciable degree.

There are times when the tread of the tire 6 will engage a surface which is inclined at an angle to the plane of rotation thereof as 29 and 30 in which cases the contacting area of the tread of the tire will be shifted laterally until one or the other of the depressions 12 and 13, 19 and 20, or 22 and 23 will be entirely covered and sealed, owing to the arrangements of the partitions 10 and 11, 17 and 18 and 24 and 25 of Figs. 2, 3 and 4 respectively, as hereinbefore described, and thereby a continuous gripping of the surface will be provided. The depressions 14, 21 and 27 always providing a suction for the tread and being assisted by either the depressions 12, 19 and 23 or 13, 20 and 22 as the case may be according to the inclination of the surface of the road.

In the foregoing description and in the following claims the word elliptically has been frequently used. It is not however intended to exclude thereby the limiting form of an ellipse which is a circle.

Having thus described my invention, what I claim and desire by Letters Patent to secure is:

1. A tire comprising a series of elliptically disposed grooves arranged circumferentially of the tread of said tire, said grooves being interrupted at points upon opposite sides of their respective centers, said interruptions being located upon opposite sides of the central plane of rotation of said tire.

2. A tire comprising a series of semi-elliptically disposed grooves arranged circumferentially of the tread of said tire, a portion of said series of grooves lying substantially upon one side of the central plane of rotation of said tire, and the other portion of said series of grooves lying upon the opposite side of said central plane of rotation, and a second series of grooves disposed between said oppositely arranged grooves and alternately inclining in opposite directions relatively to said central plane of rotation.

In testimony whereof I have hereunto set my hand in presence of two subscribing witnesses.

ROY M. P. THORP.

Witnesses:
 CHARLES S. GOODING,
 DANIEL A. ROLLINS.